(12) United States Patent
Bendall

(10) Patent No.: US 8,786,300 B2
(45) Date of Patent: Jul. 22, 2014

(54) PROBE ASSEMBLY AND METHODS FOR USE IN INSPECTING A COMPONENT

(75) Inventor: Clark Alexander Bendall, Syracuse, NY (US)

(73) Assignee: General Electric Company, Schenectady, NY (US)

( * ) Notice: Subject to any disclaimer, the term of this patent is extended or adjusted under 35 U.S.C. 154(b) by 341 days.

(21) Appl. No.: 13/367,814

(22) Filed: Feb. 7, 2012

(65) Prior Publication Data

US 2013/0201489 A1 Aug. 8, 2013

(51) Int. Cl.
*G01R 31/308* (2006.01)
*G01B 11/24* (2006.01)

(52) U.S. Cl.
USPC ..................... 324/750.23; 356/610

(58) Field of Classification Search
CPC ...... G01B 11/25; G01B 11/24; G01B 11/046; G01R 1/2853
See application file for complete search history.

(56) References Cited

U.S. PATENT DOCUMENTS

| | | | |
|---|---|---|---|
| 5,069,548 A * | 12/1991 | Boehnlein | ..................... 356/605 |
| 5,386,292 A | 1/1995 | Massen et al. | |
| 6,031,566 A | 2/2000 | Leo | |
| 6,138,081 A | 10/2000 | Olejack et al. | |
| 6,674,416 B2 | 1/2004 | Kamei et al. | |
| 7,812,968 B2 | 10/2010 | Bendall et al. | |
| 7,821,649 B2 | 10/2010 | Bendall et al. | |
| 8,107,083 B2 * | 1/2012 | Bendall et al. | ................ 356/457 |
| 2009/0225329 A1 | 9/2009 | Bendall et al. | |

OTHER PUBLICATIONS

GE Measurement and Control Solutions, Advances in High Accuracy Measurement in Remote Visual Inspection, pp. 1-4.

* cited by examiner

*Primary Examiner* — Tung X Nguyen
(74) *Attorney, Agent, or Firm* — Fletcher Yoder, P.C.

(57) ABSTRACT

A probe tip includes a plurality of light emitters and a control circuit that is coupled to the light emitters. The control circuit is configured to control a projection of a plurality of light patterns from the light emitters for performing a phase-shift analysis using a plurality of images of the light patterns that are projected onto a component being inspected. The control circuit controls the projection of the light patterns by receiving electrical energy from a drive circuit. At least one of the light emitters is identified for receiving a power input based at least in part on the electrical energy received from the drive circuit. The power input is transmitted to the identified light emitter, based at least in part on the electrical energy received from the drive circuit, to enable the activation of the identified light emitter.

20 Claims, 4 Drawing Sheets

PROBE ASSEMBLY AND METHODS FOR USE IN INSPECTING A COMPONENT

BACKGROUND OF THE INVENTION

The field of the invention relates generally to probe assemblies and, more particularly, to a probe tip for use with a probe assembly, such as a probe assembly used in systems that perform phase shift analysis.

At least some known machines include at least one component that may become damaged or worn over time. For example, aircraft engines and/or power turbines may include components such as, bearings, gears, and/or rotor blades that wear over time. Continued operation with a worn component may cause additional damage to other components or may lead to a premature failure of the component and/or associated machine.

To detect component damage within machines, the operation of at least some known machines is inspected with an inspection system. Known inspection systems may include borescopes or endoscopes, which may include probes or probe assemblies, used to detect defects and/or to identify the magnitude of a defect within a component. Most probe assemblies may be inserted inside a remote cavity to detect the defect. Probe assemblies also include an external light source, such as, for example, fiber optic bundles or light emitters that are contained within the probe assembly to provide illumination of a remote component or surface of the component. When the component is illuminated, an internal image may be formed on an image sensor via a lens system. The image may then be relayed to a connected display system such that a user may be provided with a visual output and any defects may be readily identified by the user.

The image shown on the connected display system may vary in magnification and size depending on, for example, the distance between the object and a distal end of the probe with the lens system and the image sensor. Such variations may make it difficult to determine dimensional measurements, especially in three spatial dimensions. There are known approaches for providing three dimensional (3D) data through a probe. However, there are limitations in such approaches. For example, stereo methods may be used to create 3D view, but may only provide information where two points on an image can be correlated. The correlation process may also require significant processing. Accordingly, producing a full 3D surface map may be time consuming.

Phase-shifting may be used to obtain full-field object data. Phase-shifting generally involves projecting one or more sets of parallel lines that cross the field of view (FOV) of a camera. As the object distance changes, the parallel lines, or fringe sets, shift across the FOV. Phase-shifting methods may require the use of equipments, such as, for example, projectors and/or scanners, that may not mechanically fit within probes, such as borescopes and endoscopes. In order to overcome such size limitations, some known probe systems and assemblies have been configured to perform measurements and 3D surface mapping based on phase-shift analysis without the use of such large equipment. For example, such probe assemblies may include a plurality of light emitters that includes at least one emitter group. A pattern that is projected when one of the emitter groups is emitting includes a fringe set. Probe systems or assemblies may also include an imager for obtaining at least one image of a surface and a processing unit that performs phase-shift analysis on the image.

Each light emitter included within probe assemblies with phase-shifting capabilities may be coupled directly to a drive circuit via at least one wire and each wire may be selectively coupled together via a contact. For example, if such a probe assembly includes six light emitters, then six separate wires may be coupled to the drive circuit and each wire may include a contact coupled to it. As such, such a probe assembly would include at least six wires and six contacts. However, such probe assemblies may have diameters that are relatively small, i.e., between approximately 3.9 mm to 6.2 mm. As a result, such probe assemblies may have very little space for an increased number of wires and/or contacts for use with each of the light emitters. Accordingly, the number of light emitters that may be used within probe assemblies may be limited and, subsequently, the measurement capabilities of the probe assembly may be limited.

BRIEF DESCRIPTION OF THE INVENTION

In one embodiment, a probe tip is provided. The probe tip includes a plurality of light emitters and a control circuit that is coupled to the light emitters. The control circuit is configured to control a projection of a plurality of light patterns from the light emitters for performing an analysis, such as a phase-shift analysis, using a plurality of images of the light patterns that are projected onto a component being inspected. The control circuit controls the projection of the light patterns by receiving electrical energy from a drive circuit. At least one of the light emitters is identified for receiving a power input based at least in part on the electrical energy received from the drive circuit. The power input is transmitted to the identified light emitter, based at least in part on the electrical energy received from the drive circuit, to enable the activation of the identified light emitter such that light is emitted therethrough.

In another embodiment, a probe assembly is provided. The probe assembly includes a probe body that includes a power supply and a drive circuit that is coupled to the power supply. A probe tip is coupled to the probe body. The probe tip includes a plurality of light emitters and a control circuit that is coupled to the light emitters. The control circuit is configured to control a projection of a plurality of light patterns from the light emitters for performing an analysis, such as a phase-shift analysis using a plurality of images of the light patterns that are projected onto a component being inspected. The control circuit controls the projection of the light patterns by receiving electrical energy from the drive circuit. At least one of the light emitters is identified for receiving a power input based at least in part on the electrical energy received from the drive circuit. The power input is transmitted to the identified light emitter, based at least in part on the electrical energy received from the drive circuit, to enable the activation of the identified light emitter such that light is emitted therethrough.

In yet another embodiment, a method of inspecting a component is provided. The method includes controlling a projection of a plurality of light patterns from a plurality of light emitters via a controller. The projection of the light patterns is controlled by receiving electrical energy from a drive circuit. At least one of the light emitters is identified for receiving a power input based at least in part on the electrical energy received from the drive circuit. The power input is transmitted to the light emitter, based at least in part on the electrical energy received from the drive circuit, to enable the activation of the identified light emitter such that light is emitted therethrough.

DETAILED DESCRIPTION OF THE INVENTION

The exemplary apparatus and methods described herein provide a probe tip that may be coupled to a probe assembly with phase-shifting capabilities to facilitate decreasing the number of wires and contacts that may be needed therein. The probe tip includes a plurality of light emitters and a control circuit that is coupled to the light emitters. The control circuit is configured to control a projection of a plurality of light patterns from the light emitters for performing an analysis, such as a phase-shift analysis using a plurality of images of the light patterns that are projected onto a component being inspected. The control circuit controls the projection of the light patterns by receiving electrical energy from a drive circuit, wherein the electrical energy may be, for example, within at least one of a first voltage range and a second voltage range. At least one of the light emitters is identified for receiving a power input based at least in part on the electrical energy received from the drive circuit, such as the first voltage range and/or the second voltage range received. The power input is transmitted to the identified light emitter, based at least in part on the electrical energy received from the drive circuit, such as the first voltage range and/or the second voltage range received, to enable the activation of the identified light emitter such that light is emitted therethrough. By using a control circuit to connect to the light emitters, a drive circuit is no longer directly connected to the light emitters. As such, the number of wires and contacts needed to connect the drive circuit to the light emitters may be reduced. Accordingly, the number of light emitters that can be used within the probe assembly is no longer limited and the measurement capabilities of the probe assembly may substantially increase.

Figure 1:
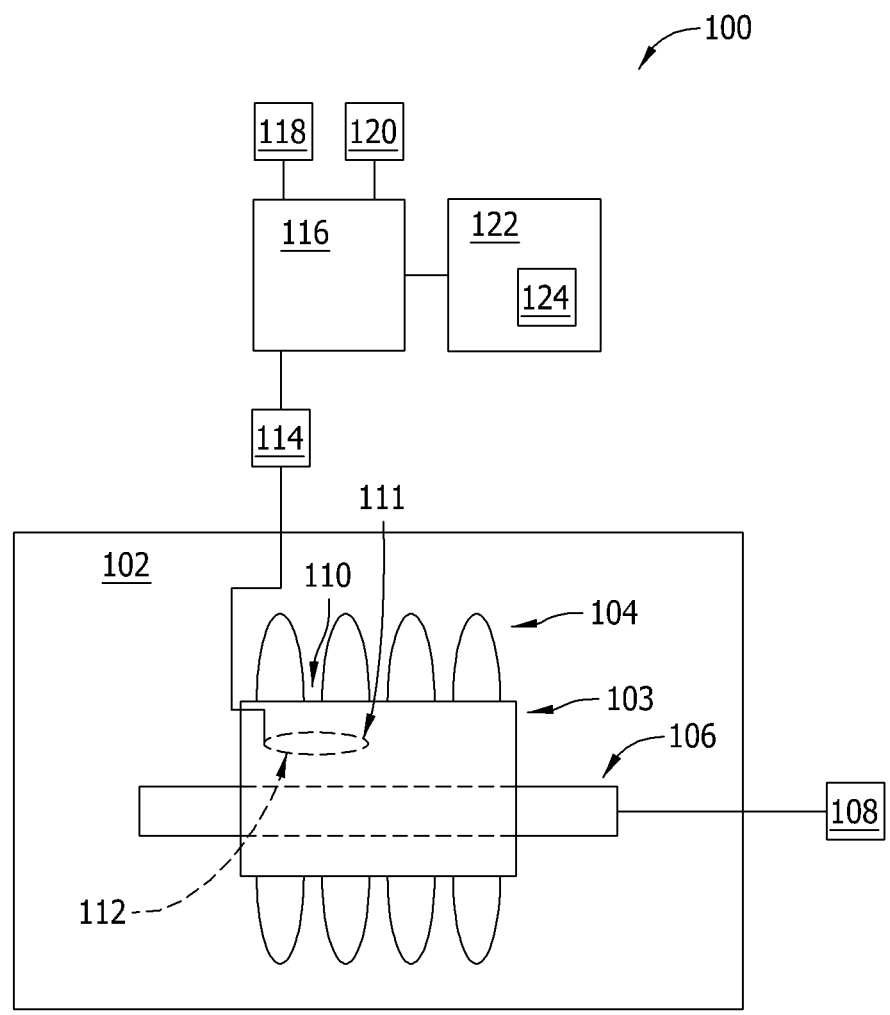
FIG. 1 is a block diagram of an exemplary inspection system.

FIG. 1 illustrates an exemplary inspection system 100 that is coupled to a machine 102. In the exemplary embodiment, machine 102 may be, but is not limited to only being, a wind turbine, a hydroelectric turbine, a gas turbine, or a compressor. In the exemplary embodiment, machine 102 includes at least one component. For example, machine 102 may include a rotor 103 having at least one rotor blade 104 and machine 102 may include a rotor shaft 106 coupled to rotor 103. In the exemplary embodiment, rotor shaft 106 is coupled to a load 108, such as a generator. Rotor shaft 106 is at least partially supported by one or more bearings (not shown) housed within machine 102 and/or within load 108. Alternatively or in addition to, the bearings may be housed within a separate support structure (not shown), such as a gearbox, or within any other structure or component that enables machine 102 to function as described herein.

In the exemplary embodiment, inspection system 100 includes at least one probe assembly 110 that is coupled to rotor 103. More specifically, in the exemplary embodiment, probe assembly 110 is positioned within a cavity or bore (not shown) defined within rotor 103. Probe assembly 110, in the exemplary embodiment, includes a probe tip 111 coupled to a probe body 112. Probe assembly 110 measures and/or inspects at least one operating condition of rotor 103 such that any defects within rotor 103 may be identified. More specifically, in the exemplary embodiment, probe assembly 110 is a borescope that is configured to enable the projection of structured light patterns that are needed to perform a phase shift analysis of a portion of rotor 103 that probe assembly 110 is positioned proximate to. Alternatively, probe assembly 110 may be any other type of probe used for measuring and/or inspecting any other parameter of machine 102 or components, such as rotor 103, and that enables inspection system 100 to function as described herein. For example, probe assembly 110 may include flexible tubes (not shown) that are often inserted through inspection ports (not shown) or other openings (not shown) in a housing of an asset or component 103 to view the internal parts of the asset or component 103.

Probe assembly 110 also includes an imager (not shown in FIG. 1). The imager may be flexible and may include, for example, a two-dimensional array of light-sensitive elements (not shown) that transmits a video signal in response to the light level sensed at each element. The imager is coupled to electronics (not shown in FIG. 1) that is configured to buffer the video signal. The electronics is coupled to imager interface electronics 114. Imager interface electronics 114 may include, for example a timing generator for generating imager clock signals (not shown), an analog front end for digitizing the imager video output signal (not shown), and a digital signal processor (not shown) for processing the digitized imager video data into various formats.

A diagnostic system 116 is coupled to the electronics via imager interface electronics 114. More specifically, in the exemplary embodiment, diagnostic system 116 is a video processor and imager interface electronics 114 processes the digitized imager video data into a format for diagnostic system 116. Diagnostic system 116 may perform various functions, such as image capture, image enhancement, graphical overlay merging, and video format conversion. Diagnostic system 116 may also store information relating to those functions in a video memory 118. Diagnostic system 116 may include a field-programmable gate array (FPGA), digital signal processor (DSP), or other processing elements and may provide information to and receive information from a central processing unit (CPU) 120. The provided and received information may relate to commands, status information, video, still images, and/or graphical overlays.

Diagnostic system 116 may further transmit video signals to a computing device 122. Computing device 122 may include a processing unit (not shown) for use in processing and/or analyzing one or more signals generated by Diagnostic system 116. Computing device 122 may include a display device 124 configured to display a visual output to a user. Display device 124 may be a visual display device, such as a cathode ray tube (CRT), a liquid crystal display (LCD), an organic LED (OLED) display, and/or an "electronic ink" display.

During operation, in the exemplary embodiment, damage, such as a fault, may occur within rotor 103 as result of frequent operation of machine 102. For example, vibrations may be induced to rotor 103 and/or rotor 103 may expand or contract as an operating temperature within machine 102 changes. As explained in more detail below, probe assembly 110 projects structured light patterns on a surface (not shown) of rotor 103 such that a phase shift analysis using a plurality of images of the light patterns that are projected onto the surface of rotor 103 may be performed. More specifically, the imager that is positioned within probe assembly 110 captures a plurality of images of the surface of rotor 103. At least one signal representative of the image may be transmitted to diagnostic system 116. Computing device 122 further analyzes and/or processes the signal. For example, computing device 122 and/or diagnostic system 116 may apply a phase shift analysis to the images received from the imager to generate a surface map. At least one visual output of the images and/or analysis may then be presented to the user via display device 124. The user may then obtain various measurements. For example, the user may position, for example, a cursor on one of the images of the surface and computing device 122 may use three dimensional coordinates from the surface map at the cursor locations to determine dimensions. A textual output of the dimensions may be presented to the user via display device 124.

Figure 2:
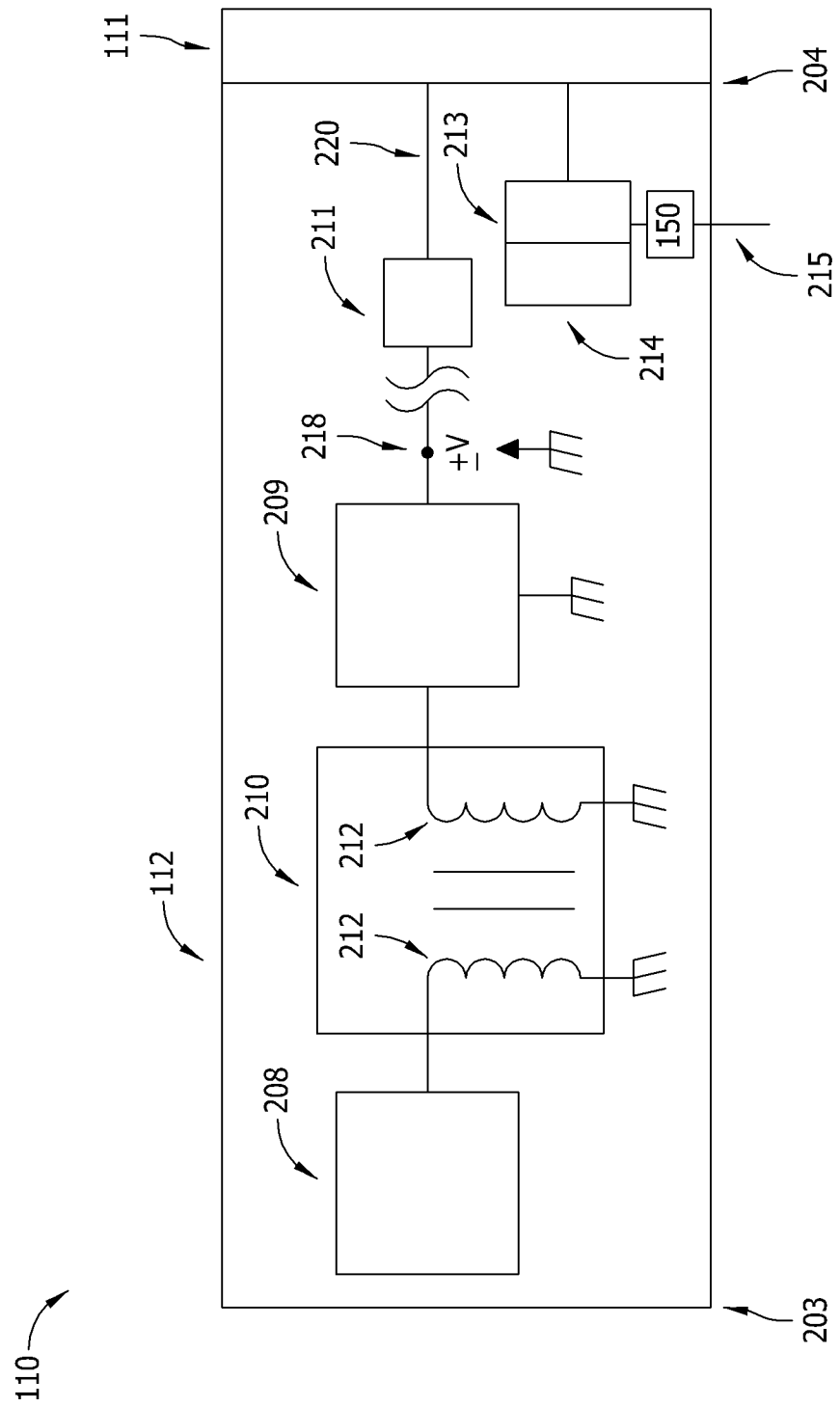
FIG. 2 is a block diagram of a portion of an exemplary probe assembly that may be used with the inspection system shown in FIG. 1.
Figure 3:
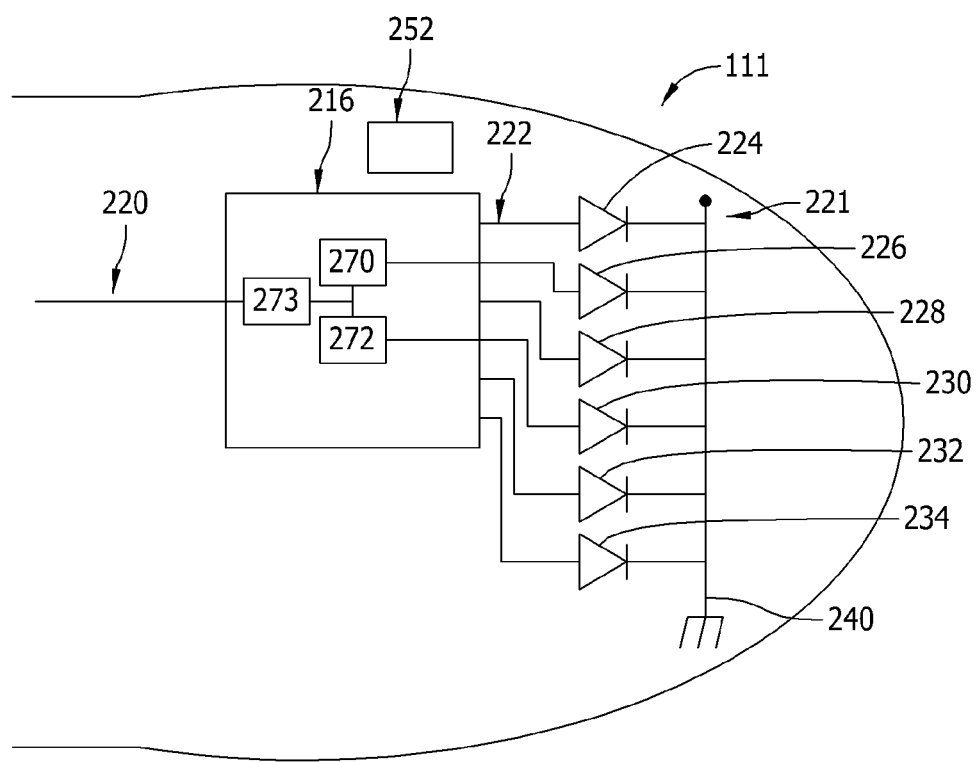
FIG. 3 is a block diagram of an exemplary probe tip that may be used with the probe assembly shown in FIG. 2.

FIG. 2 illustrates an embodiment of probe assembly 110. FIG. 3 illustrates an embodiment of probe tip 111. Referring to FIG. 2, probe assembly 110 has an elongated insertion portion or probe body 112, wherein probe body 112 includes a proximal portion or a first end portion 203 and a distal portion or a second end portion 204. Probe assembly 110 also includes a probe tip 111 that is coupled to second end portion 204. In the exemplary embodiment, probe tip 111 is detachably coupled to probe body 112. Alternatively, probe tip 111 may be integrally formed with probe body 112.

Probe body 112, in the exemplary embodiment, includes a main power supply 208 that is positioned proximate to first end portion 203. Power supply 208 may be, for example, a rechargeable lithium ion battery. Alternatively, power supply 208 may be any type of device configured to supply electrical energy within probe assembly 110. Power supply 208 is coupled to a drive circuit 209, within first end portion 203, via an isolation circuit or transformer 210. In the exemplary embodiment, transformer 210 includes a plurality of conductors 212 and is configured to adjust the electrical energy received from power supply 208. For example, conductors 212 may adjust a voltage and/or a current level of the electrical energy received by the power supply to a voltage and/or a current level suitable for use with drive circuit 209. In the exemplary embodiment, drive circuit 209 is coupled to a contact 211.

Drive circuit 209 may be configured to operate within at least one voltage range in a communicating mode and/or a supplying mode. For example, in the exemplary embodiment, drive circuit 209 may operate within a first voltage range and a second voltage range that is lower than the first voltage range. More specifically, in the exemplary embodiment, the second voltage range is a communication voltage range of between about 1 Volt and about 10 Volts enabling drive circuit 209 to operate in a communicating mode. The first voltage range is a power voltage range of between about 15 Volts and about 25 Volts enabling drive circuit 209 to operate in a supplying mode. Drive circuit 209 may operate as a voltage source when operating in the communicating mode and a current source when operating in the supplying mode. Moreover, a polarity of a voltage present at an output of drive circuit 209 when drive circuit 209 is in the supplying mode may be different than a polarity of a voltage present at the output when drive circuit 209 is in the communicating mode.

Also included within probe body 112, within second end portion 204 proximate to probe tip 111 is an imager 213. Imager 213 may include, for example, a two-dimensional array of light-sensitive elements (not shown) that transmits a video signal in response to the light level sensed at each element. Imager 213 may also include a charge-coupled device (CCD) (not shown), complementary metal-oxide-semiconductor (CMOS) image sensor (not shown), or any other devices that enables probe assembly 110 to function as described herein. Imager 213 is coupled to electronics 214, and electronics 214 is coupled to imager interface electronics 114 (shown in FIG. 1) via a signal conduit 215. In the exemplary embodiment, imager 213 is configured to convert optical images of the plurality of structured light patterns that are reflected from the surface of, for example, rotor 103 to an electrical video signal.

A processor 150 is coupled to imager 213 for determining the geometric characteristics of the surface of, for example, rotor 103, by using the images that are derived from the electrical video signal. In the exemplary embodiment, the term "processor" refers generally to any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term "processor."

Referring to FIG. 3, probe tip 111 includes a control circuit 216 that is selectively coupled to drive circuit 209 via contact 211 such that drive circuit 209 is coupled to contact 211 via a conduit 218 and control circuit 216 is coupled to contact 211 via a conduit 220. In the exemplary embodiment, conduits 218 and 220 are wires that facilitate an electrical connection between control circuit 216 and drive circuit 209. Alternatively, any other type of electrical connection may be used between control circuit 216 and drive circuit 209 that enables probe assembly 110 and/or inspection system 100 (shown in FIG. 1) to function as described herein. Moreover, conduits 218 and 220 may be any length that enables probe assembly 110 to function as described herein. For example, probe assembly 110 may include a length of an insertion tube or cable (not shown) that would enable a distance between drive circuit 209 and control circuit 216 to be as long as at least approximately 100 feet. Moreover, while both drive circuit 209 and control circuit 216 are illustrated as being positioned within probe assembly 110 in the exemplary embodiment, it should be noted that the position of drive circuit 209 and control circuit 216 may vary. More specifically, the length of conduit 218 may be relatively long, and conduit 215 may be within the same insertion tube or cable (not shown) as conduit 218 such that the length of conduit 215 may be substantially proportional to the length of conduit 218.

Probe tip 111 also includes a plurality of light emitters 221 that are each coupled to control circuit 216 via a power conductor 222, wherein emitters 221 may include a first emitter 224, a second emitter 226, a third emitter 228, a fourth emitter 230, a fifth emitter 232, and a sixth emitter 234. Alternatively, probe tip 111 may include any number of emitters that enable probe assembly 110 and/or inspection system 100 to function as described herein. In the exemplary embodiment, emitters 221 are light emitting diodes (LEDs). Alternatively, emitters 221 may each be any other type of emitters that enable probe assembly 110 and/or inspection system 100 to function as described herein. Probe tip 111, in the exemplary embodiment, also includes a ground connection 240 that is coupled to each emitter, 224, 226, 228, 230, 232, and 234, wherein ground connection 240 is configured to return electrical current passed through each emitter 224, 226, 228, 230, 232, and 234 back to drive circuit 209. In the exemplary embodiment, ground connection 240 may include a wire used to channel the current through emitters 221 and back to drive circuit 209. Alternatively, probe assembly 110 may include other structural components, such as but not limited to a conductive braided jacket, a conductive monocoil, conductive articulation cables, conductive housings, to return the current from emitters 221 back to drive circuit 209, thereby, eliminating the need for a dedicated wire or electrical contact for that purpose. The return ground current may also be carried on a wire that serves to carry other electrical signals or currents. For example, the probe may include a coaxial cable for carrying video information output by an imager to a proximal processing circuitry. The outer shield of that coaxial cable may be utilized to return the current from emitters 221 back to drive circuit 209 in addition to carrying ground current associated with the video signal.

In the exemplary embodiment, control circuit 216 includes any suitable analog and/or digital circuit and/or circuit components. For example, control circuit 216 may include any suitable processor-based or microprocessor-based system, such as a computer system, that includes microcontrollers, reduced instruction set circuits (RISC), application-specific integrated circuits (ASIC), programmable logic controllers (PLC), logic circuits, and/or any other circuit or processor that is capable of executing the functions described herein. In one embodiment, control circuit 216 may include a processor 273 having a single processing unit or having multiple processing units (e.g., in a multi-core configuration). The above examples are exemplary only, and thus are not intended to limit in any way the definition and/or meaning of the term "control circuit".

Moreover, in the exemplary embodiment, control circuit 216 is configured to receive electrical energy from drive circuit 209 within at least one voltage range. More specifically, in the exemplary embodiment, control circuit 216 is configured to receive the first voltage range and/or the second voltage range from drive circuit 209. Control circuit 216 is also configured to detect the transition between the first and second voltage range received from drive circuit 209. More specifically, control circuit 216 is configured to channel electrical output from drive circuit 209 operating in the supplying mode to a first set of emitters 221 during a first emitting period. Control circuit 216 is also configured to channel electrical output from drive circuit 209 operating in the supplying mode to a second set of emitters 221 during a second emitting period, wherein the second set of emitters 221 are different from the first set of emitters 221. Control circuit 216 may include a first switch 270 through which current output from drive circuit 209 pass during the first emitting period. Control circuit 216 may also include a second switch 272 through which current passes during the second emitting period. Switch 270 and switch 272 may be semiconductor switches. There may also be included additional switches (not shown) for each of emitters 221.

During operation, electrical energy is supplied from power supply 208 to transformer 210 and then to drive circuit 209. In the exemplary embodiment, drive circuit 209 operates within the first voltage range (i.e., supplying mode) or the second voltage range (communicating mode). More specifically, drive circuit 209 will transmit electrical energy to control circuit 216 in either the first voltage range or the second voltage range. Control circuit 216 controls a projection of a plurality of light patterns from light emitters 221 for performing a phase-shift analysis using a plurality of images of the light patterns that are projected onto a component, such as rotor 103 (shown in FIG. 1), being inspected.

In the exemplary embodiment, when drive circuit 209 transmits electrical energy in the second voltage range and operating in the communicating mode, drive circuit 209 is communicating to control circuit 216 which one of the emitters 221 control circuit 216 should identify for transmitting power during an emitting period. When drive circuit 209 transmits electrical energy in the first voltage range and is operating in a supplying mode, drive circuit 209 operates as a current source and transmits a signal to control circuit 216 to transmit power to the identified emitter 221. For example, in the exemplary embodiment, control circuit 216 may receive electrical energy in the second voltage range and, based on the voltage level received within the second voltage range, control circuit 216 may identify one of emitters 221 to receive a power input. For example, each voltage level within the second voltage range may correspond to a specific emitter 221. More specifically, electrical energy levels of 1 Volt, 2 Volts, 3 Volts, 4 Volts, 5 Volts, and 6 Volts may correspond to emitters 224, 226, 228, 230, 232, and 234, respectively. A binary pattern of the voltages within the second voltage range may also correspond to a sequential order for identifying emitters 224, 226, 228, 230, 232, and 234 for receiving a power input. Alternatively, control circuit 216 may identify emitters 221 for receiving a power input using any other means that enables probe assembly 110 to function as described herein.

Control circuit 216 also detects a transition between the first voltage range and the second voltage range received from drive circuit 209. For example, control circuit 216 may receive a voltage level of 2 Volts and, based on this voltage level, may identify second emitter 226 as receiving a power input. Then, the next voltage level that control circuit 216 may receive may be 17 Volts. Control circuit 216 detects that there has been a transition from the second voltage range to the first voltage range. In addition, control circuit 216 identifies that the 17 Volts received from drive circuit 209 corresponds to transmitting a power input to the identified emitter 226. More specifically, control circuit 216 transmits a power input, via power conductor 222, to emitter 226 in order to activate emitter 226. More specifically, light is emitted through emitter 226 and to a surface (not shown) of a component being inspected, such as rotor 103. The current passing through emitter 226 returns to drive circuit 209 through ground connection 240.

When one of emitters 221 has received a power input, control circuit 216 will then identify a different emitter for receiving power during the next voltage level that control circuit 216 receives from drive circuit 209. For example, in the exemplary embodiment, since emitter 226 has received power, then the next voltage level that drive circuit 209 may transmit may be 3 Volts. When control circuit 216 receives the energy level of 3 Volts, control circuit 216 identifies third emitter 228 as scheduled to receive a power input. Then when control circuit 216 receives electrical energy within the first voltage range from drive circuit 209, control circuit 216 will then switch a power input to third emitter 228. In the exemplary embodiment, drive circuit 209 may transmit a voltage level to control circuit 216 such that the identification of emitters 221 may be made sequentially. For example, drive circuit 209 may transmit a voltage level to control circuit 216 that corresponds to the identifying first emitter 224 for receiving power first. Drive circuit 209 may then transmit a voltage level to control circuit 216 that corresponds to identifying second emitter 226 for receiving a power input. Drive circuit 209 may continue to transmit voltage levels until each one of emitters 221 have been identified sequentially.

While the exemplary embodiment includes electrical energy being transmitted to control circuit 216 in two different voltage ranges, other forms of electrical communication may occur between drive circuit 209 and control circuit 216. Drive circuit 209 may, alternatively, transmit voltage levels to control circuit 216 such that the identification of emitters 221 for receiving power is done via other patterns. For example, drive circuit 209 may transmit a binary pattern, or a frequency, or a modulated signal. Any pattern of communication, many of which are known in the electrical arts, may be suitable. In fact, drive circuit 209 may transmit voltage levels to control circuit 216 via any pattern for the identification of emitters 221 for receiving a power input that enables probe assembly 110 to function as described herein. Moreover, in the various patterns of communication used, more than one emitter may be illuminated and/or activated at the same time.

Control circuit 216 may also be configured to connect the drive circuit 209 to at least one of the plurality of emitters 221 in a pre-determined order. It is preferable that control circuit 216 receives electrical energy or power from drive circuit 209 via the same conduit that is used to activate or power the emitters 221. Alternatively, control circuit 216 may receive electrical energy or power from drive 209 via a different conduit than the conduit that is used to activate or power the emitters 221. For example, at times when no emitter 221 is to be powered, drive circuit 209 may output a voltage of zero Volts causing a power down of control circuit 216. To initiate pattern projections, drive circuit 209 may output a voltage within a second voltage range that is sufficient to power up control circuit 216. Drive circuit 209 then changes its output voltage to be within a first voltage range. Control circuit 216 may also connect the next emitter 221 to an input line, such as conduits 220 and/or 222, prior to control circuit 216 detecting a transition to the first voltage range. Then control circuit 216 detects the change from the second voltage range to the first voltage range and connects a first emitter 221, as defined in the pre-determined order, to receive current from drive circuit 209, thereby generating light to project a pattern. Drive circuit 209 then changes the voltage to a level within the second voltage range to request a change to a second emitter 221. Control circuit 216 detects that level and determines the next emitter 221 to be powered according to the pre-determined order. Drive circuit 209 then outputs a voltage in the first voltage range, which is detected by control circuit 216 enabling drive circuit 209 to connect the next emitter 221 to receive current from drive circuit 209. Thus, by alternating between a second voltage range and a first voltage range, the combined operations of drive circuit 209 and the control circuit 216 power the emitters 221 in a pre-determined order to generate the required structured light patterns.

The viewing optics and probe optics within probe assembly 110 guide and focus received light patterns reflected from rotor 103 or a surface (not shown) of rotor 103 onto imager 213. Imager 213 converts optical images of the plurality of structured light patterns that are reflected from the surface of rotor 103 to an electrical video signal that is transmitted to processor 150 and/or diagnostic system 116 to determine the geometric characteristics of the surface of rotor 103 by using the images that are derived from the electrical video signal. Computing device 122 (shown in FIG. 1) further analyzes and/or processes the signal such that a visual output of the image may be presented to the user via display device 124 (shown in FIG. 1).

Figure 4:
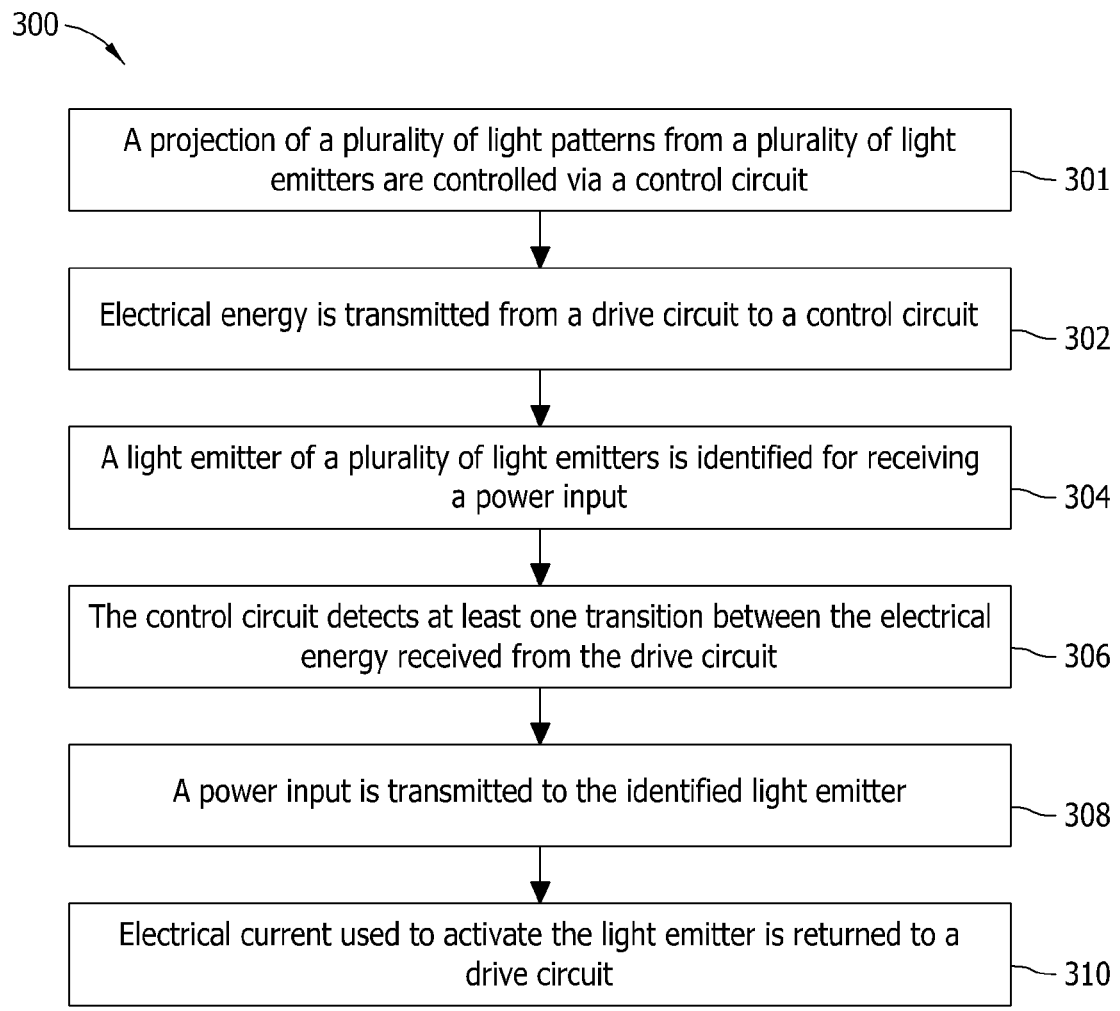
FIG. 4 is a flow diagram of an exemplary method for use in inspecting a component.

FIG. 4 illustrates an exemplary method 300 for use in inspecting a component, such as a rotor 103 (shown in FIG. 1), using a probe assembly 110 (shown in FIGS. 1 and 2). A projection of a plurality of light patterns from a plurality of light emitters 221 (shown in FIG. 3) are controlled 301 via a control circuit 216 (shown in FIG. 3). More specifically, electrical energy is transmitted 302 from a drive circuit 209 (shown in FIG. 2) positioned within a probe body 112 (shown in FIG. 2) to control circuit 216, wherein the electrical energy transmitted may be within at least one of a first voltage range and a second voltage range.

A light emitter, such as light emitters 224, 226, 228, 230, 232, or 234 (shown in FIG. 3), of a plurality of light emitters 221 (shown in FIG. 3) is then identified 304, via control circuit 216, for receiving a power input based on the electrical energy received from drive circuit 209. Control circuit 216 detects 306 at least one transition in the electrical energy, such as between the first voltage range and/or the second voltage range, received from drive circuit 209. The power input is transmitted 308 via control circuit 216 to the identified light emitter 221 to activate light emitter 221 such that light is emitted therethrough. Electrical current used to activate the light emitter is returned 310 to a drive circuit 209 (shown in FIG. 2) via a ground connection 240 (shown in FIG. 3).

As compared to known probe assemblies with phase-shifting capabilities, the exemplary probe assembly described herein enables a decrease in the number of wires and contacts that may be needed therein. More specifically, the embodiments described herein provide a probe tip that includes a plurality of light emitters and a control circuit that is coupled to the light emitters. The control circuit controls the projection of the light patterns by receiving electrical energy from a drive circuit, wherein the electrical energy may be, for example, within at least one of a first voltage range and a second voltage range. At least one of the light emitters is identified for receiving a power input based at least in part on the electrical energy received from the drive circuit, such as the first voltage range and/or the second voltage range received. The power input is transmitted to the identified light emitter, based at least in part on the electrical energy received from the drive circuit, such as the first voltage range and/or the second voltage range received, to enable the activation of the identified light emitter such that light is emitted therethrough. By using a control circuit to connect to the light emitters, a drive circuit is no longer directly connected to the light emitters. As such, the number of wires and contacts needed to connect the drive circuit to the light emitters may be reduced. Accordingly, the number of light emitters that can be used within the probe assembly is no longer limited and the measurement capabilities of the probe assembly may substantially increase.

Exemplary embodiments of a probe assembly and methods for use in inspecting a component are described above in detail. The methods and probe assembly are not limited to the specific embodiments described herein, but rather, components of the probe assembly and/or steps of the methods may be utilized independently and separately from other components and/or steps described herein. For example, the probe assembly may also be used in combination with other measuring systems and methods, and is not limited to practice with only the inspection system as described herein. Rather, the exemplary embodiment can be implemented and utilized in connection with many other measurement and/or inspection applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A probe tip comprising:
a plurality of light emitters; and
a control circuit coupled to said plurality of light emitters, said control circuit is configured to control a projection of a plurality of light patterns from said plurality of light emitters for performing an analysis of the plurality of light patterns using a plurality of images of the plurality of light patterns on a component being inspected, wherein said control circuit controls the projection of the plurality of light patterns by:
receiving electrical energy from a drive circuit;
identifying at least one of said plurality of light emitters for receiving a power input based at least in part on the received electrical energy; and
transmitting the power input to said at least one identified light emitter based at least in part on the received electrical energy to enable the activation of said at least one identified light emitter such that light is emitted therethrough.

2. A probe tip in accordance with claim 1, wherein said control circuit is configured to identify one of said plurality of light emitters based at least partially on at least one of a current, a voltage, a transition, a modulation, a frequency, and a binary pattern that each correspond to said at least one identified light emitter.

3. A probe tip in accordance with claim 1, wherein said control circuit is configured to receive electrical energy from the drive circuit within at least one of a first voltage range and a second voltage range.

4. A probe tip in accordance with claim 3, wherein said control circuit is configured to identify one of said plurality of light emitters based at least partially on the second voltage range of between about 1 Volt and about 10 Volts received from the drive circuit and said control circuit is configured to transmit the power input to said at least one identified light emitter based at least partially on the first voltage range of between about 15 Volts and about 25 Volts received from the drive circuit.

5. A probe tip in accordance with claim 3, wherein said control circuit is further configured to detect at least one transition between the first voltage range and the second voltage range received from the drive circuit.

6. A probe tip in accordance with claim 1, wherein said control circuit is configured to control the projection of the plurality of light patterns from said plurality of light emitters for performing a phase-shift analysis.

7. A probe tip in accordance with claim 1, wherein said control circuit is further configured to identify a different light emitter of said plurality of light emitters for receiving the power input after said at least one identified light emitter has received the power input.

8. A probe assembly comprising:
a probe body comprising a power supply; and
a probe tip coupled to said probe body, said probe tip comprising:
a plurality of light emitters; and
a control circuit coupled to said plurality of light emitters, said control circuit is configured to control a projection of a plurality of light patterns from said plurality of light emitters for performing an analysis of the plurality of light patterns using images of the plurality of light patterns on a component being inspected, wherein said control circuit controls the projection of the plurality of light patterns by:
receiving electrical energy from a drive circuit;
identifying at least one of said plurality of light emitters for receiving a power input based at least in part on the received electrical energy; and
transmitting the power input to said at least one identified light emitter, based at least in part on the received electrical energy to enable the activation of said at least one identified light emitter such that light is emitted therethrough.

9. A probe assembly in accordance with claim 8, wherein said control circuit is configured to identify one of said plurality of light emitters based at least partially on at least one of a current, a voltage, a transition, a modulation, a frequency, and a binary pattern that each correspond to said at least one identified light emitter.

10. A probe assembly in accordance with claim 8, wherein said control circuit is configured to receive electrical energy from the drive circuit within at least one of a first voltage range and a second voltage range.

11. A probe assembly in accordance with claim 10, wherein said control circuit is configured to identify one of said plurality of light emitters based at least partially on the second voltage range of between about 1 Volt and about 10 Volts received from the drive circuit and said control circuit is configured to transmit the power input to said at least one identified light emitter based at least partially on the first voltage range of between about 15 Volts and about 25 Volts received from the drive circuit.

12. A probe assembly in accordance with claim 10, wherein said control circuit is further configured to detect at least one transition between the first voltage range and the second voltage range received from the drive circuit.

13. A probe assembly in accordance with claim 8, wherein said control circuit is configured to control the projection of the plurality of light patterns from said plurality of light emitters for performing a phase-shift analysis.

14. A probe assembly in accordance with claim 8, wherein said control circuit is further configured to identify a different light emitter of said plurality of light emitters for receiving the power input after said at least one identified light emitter has received the power input.

15. A method of inspecting a component, said method comprising controlling a projection of a plurality of light patterns from a plurality of light emitters via a controller, wherein controlling the projection of the plurality of light patterns further comprises:
receiving electrical energy from a drive circuit;
identifying at least one of the plurality of light emitters for receiving a power input based at least in part on the received electrical energy; and
transmitting the power input to the at least one identified light emitter, based at least in part on the received electrical energy, to enable the activation of the at least one identified light emitter such that light is emitted therethrough.

16. A method in accordance with claim 15, further comprising performing a phase shift analysis using a plurality of images of the plurality of light patterns on the component being inspected.

17. A method in accordance with claim 15, wherein receiving electrical energy further comprises receiving electrical energy from the drive circuit within at least one of a first voltage range and a second voltage range.

18. A method in accordance with claim 17, wherein identifying at least one of the plurality of light emitters further comprises identifying at least one of the plurality of light emitters based at least partially on the second voltage range of between about 1 Volt and about 10 Volts received from the drive circuit.

19. A method in accordance with claim 17, wherein transmitting the power input further comprises transmitting the power input based at least partially on the first voltage range of between about 15 Volts and about 25 Volts received from the drive circuit.

20. A method in accordance with claim 15, wherein identifying at least one of the plurality of light emitters further comprises identifying at least one of the plurality of light emitters based at least partially on one of a current, a voltage, a transition, a modulation, a frequency, and a binary pattern that each correspond to the at least one identified light emitter.

* * * * *